United States Patent
Ou et al.

(10) Patent No.: US 7,626,403 B2
(45) Date of Patent: Dec. 1, 2009

(54) PHOTOSENSOR TESTING DEVICE WITH BUILT-IN LIGHT SOURCE AND TESTER PROVIDED WITH SAID DEVICE

(75) Inventors: Joy Ou, Taoyuan Hsien (TW); Albert Fan, Taoyuan Hsien (TW)

(73) Assignee: Chroma Ate Inc., Taoyuan Hsien (TW)

( * ) Notice: Subject to any disclaimer, the term of this patent is extended or adjusted under 35 U.S.C. 154(b) by 6 days.

(21) Appl. No.: 11/987,439

(22) Filed: Nov. 30, 2007

(65) Prior Publication Data

US 2008/0129304 A1 Jun. 5, 2008

(30) Foreign Application Priority Data

Nov. 30, 2006 (TW) ............................. 95144468 A

(51) Int. Cl.
*G01R 31/302* (2006.01)
(52) U.S. Cl. ...................................... 324/752
(58) Field of Classification Search ........................ None
See application file for complete search history.

(56) References Cited

U.S. PATENT DOCUMENTS

| | | | |
|---|---|---|---|
| 6,037,578 A * | 3/2000 | Grandjean | 324/158.1 |
| 6,373,044 B1 * | 4/2002 | Seehawer | 250/205 |
| 6,448,802 B1 * | 9/2002 | Hirt | 324/765 |
| 6,608,293 B2 * | 8/2003 | Kuderer | 250/200 |
| 6,686,760 B2 * | 2/2004 | Hirt | 324/765 |
| 6,956,226 B2 * | 10/2005 | Bennewitz et al. | 324/767 |
| 2002/0158653 A1 * | 10/2002 | Hirt | 324/765 |
| 2003/0169063 A1 * | 9/2003 | Hirt | 324/765 |
| 2004/0223326 A1 * | 11/2004 | Wainwright | 362/231 |

FOREIGN PATENT DOCUMENTS

JP 02115736 A * 4/1990

* cited by examiner

*Primary Examiner*—Jermele M Hollington
(74) *Attorney, Agent, or Firm*—Bacon & Thomas, PLLC

(57) ABSTRACT

The present invention provides a photosensor testing device with a built-in light source and a tester provided with said device, which has a base and an upper cover disposed above the base, characterized in that the upper cover is equipped with at least one light emitting diode (LED) assembly used as a light source for a photosensor under test to undergo testing operation. Therefore, the components such as high intensity discharge lamps and optical processing devices are unnecessary any more, reducing the bulk volume of the testing device and its related cost. Besides, the testing process would be speeded up and the testing accuracy could be improved, as well as the time consumed in replacing the light source would be saved.

10 Claims, 7 Drawing Sheets

PHOTOSENSOR TESTING DEVICE WITH BUILT-IN LIGHT SOURCE AND TESTER PROVIDED WITH SAID DEVICE

FIELD OF THE INVENTION

The present invention relates to a photosensor testing device, more particularly to a photosensor testing device with a built-in light source.

BACKGROUND OF THE INVENTION

Photosensors such as charge coupled device (CCD) or complementary metal oxide semiconductor (CMOS) and the like have been widely applied in mobile phones, safety monitoring systems, or industrial tester. As a result, there is increasing demand for testing the photosensors. Because most photosensors comprises a large number of cells of array, the spatial uniformity of a photosensor depends on whether each cell could have the same response to the light beams with the same intensity or not. Whether the responses to the light beams with different wavelengths for each cell are the same or not would determine whether a photosensor could achieve white balance or not. And the speeds of the responses to incident light beams for each cell would determine the response speed of a photosensor. That is to say, these are the optical properties which determine the quality of a photosensor.

In order to obtain the spatial uniformity and white balance data of a photosensor, as illustrated in FIGS. 1 and 2, the traditional tester 1 for testing photosensors includes a high intensity discharge lamp 10, an optical processing device 11 and a light detecting device. The high intensity discharge lamp 10 is used to provide light beams with different wavelengths to the optical processing device 11, after homogenizing the light via the color wheel 110 in the optical processing device 11 and the subsequent optical lens module, projecting the homogeneous light after this treatment onto the loading seat 12. The homogeneous light passes through the aperture 121 in the upper cover 120, illuminating a photosensor under test 13, such as a CMOS chip. Each cell in the photosensor under test 13 senses the incident intensities and then the corresponding sense signals by its conversion would be outputted to a control device (not shown) via a plurality of leads 122 electrically connected to the photosensor, thus obtaining the testing results. The operations such as classification (shipping inspection), reduction of the pixels and gray scales of defectives within the acceptable range (serve as sub-quality products), and the like are performed according to the testing results.

However, the traditional tester 1 for testing photosensors needs to be equipped with the above high intensity discharge lamp 10, optical processing device 11, loading seat 12 and the like. In particular, the optical processing device occupies a large space, leading to a relatively high cost. Furthermore, halogen bulbs are often used as the high intensity discharge lamp 10 so that it would become a serious defect in those tests, which require stable-wavelength light sources, due to the drifts and unstable wavelength values of each wavelength component in the above halogen bulb light sources. In addition, frequent replacement of the bulbs also results in relatively higher cost due to their great consumption.

SUMMARY OF THE INVENTION

An objective of the present invention is to provide a photosensor testing device with a built-in light source and a tester provided with said device, whereby reducing the bulk volume of the tester.

Another objective of the present invention is to provide a photosensor testing device with a built-in light source and a tester provided with said device in order to lower the total cost of the tester.

Another objective of the present invention is to provide a built-in light source using light emitting diode assembly for the provision of a testing device with emitted light at stable wavelength and with a long-life light source.

Another objective of the present invention is to provide a photosensor testing device with a built-in LED assembly allowing for speeding up the testing process.

Therefore, the present invention provides a photosensor testing device with a built-in light source provided for testing a photosensor under test, which comprises a base and an upper cover. The above base is equipped with a loading portion, wherein an accommodating space for receiving said photosensor under test is arranged on said loading portion, wherein at least one light emitting diode assembly is mounted inside said upper cover. The upper cover is disposed above said base and allowable to be opened or closed relative to said base. When said photosensor under test is placed into the accommodating space and the upper cover is closed relative to said base, the light emitting diode assembly would be activated and project light beams on the surface of said photosensor under test to undergo a testing process.

The present invention also provides a tester provided for testing a photosensor under test, comprising a power supply, a photosensor testing device and a controller, wherein the photosensor testing device includes a base equipped with a loading portion on which an accommodating portion for receiving said photosensor under test is arranged; and an upper cover disposed above said base and allowed to be opened or closed relative to said base, wherein at least one light emitting diode assembly is mounted inside said upper cover. Said controller includes a processor which could conduct arithmetic operations according to its built-in programs. This controller could turn on the power supply under control, activating the light emitting diode assembly in said photosensor testing device to provide a light source for the photosensor under test, which senses the light source and then the corresponding signals by its conversion would be sent to said controller to commence the corresponding process.

BRIEF DESCRIPTION OF THE DRAWINGS

The above-mentioned and other technical contents, features, and effects of the present invention are clearly illustrated in the following detailed description of the preferred embodiments in coordination with the reference drawings.

DETAILED DESCRIPTION OF THE PREFERRED EMBODIMENTS

Figure 1:
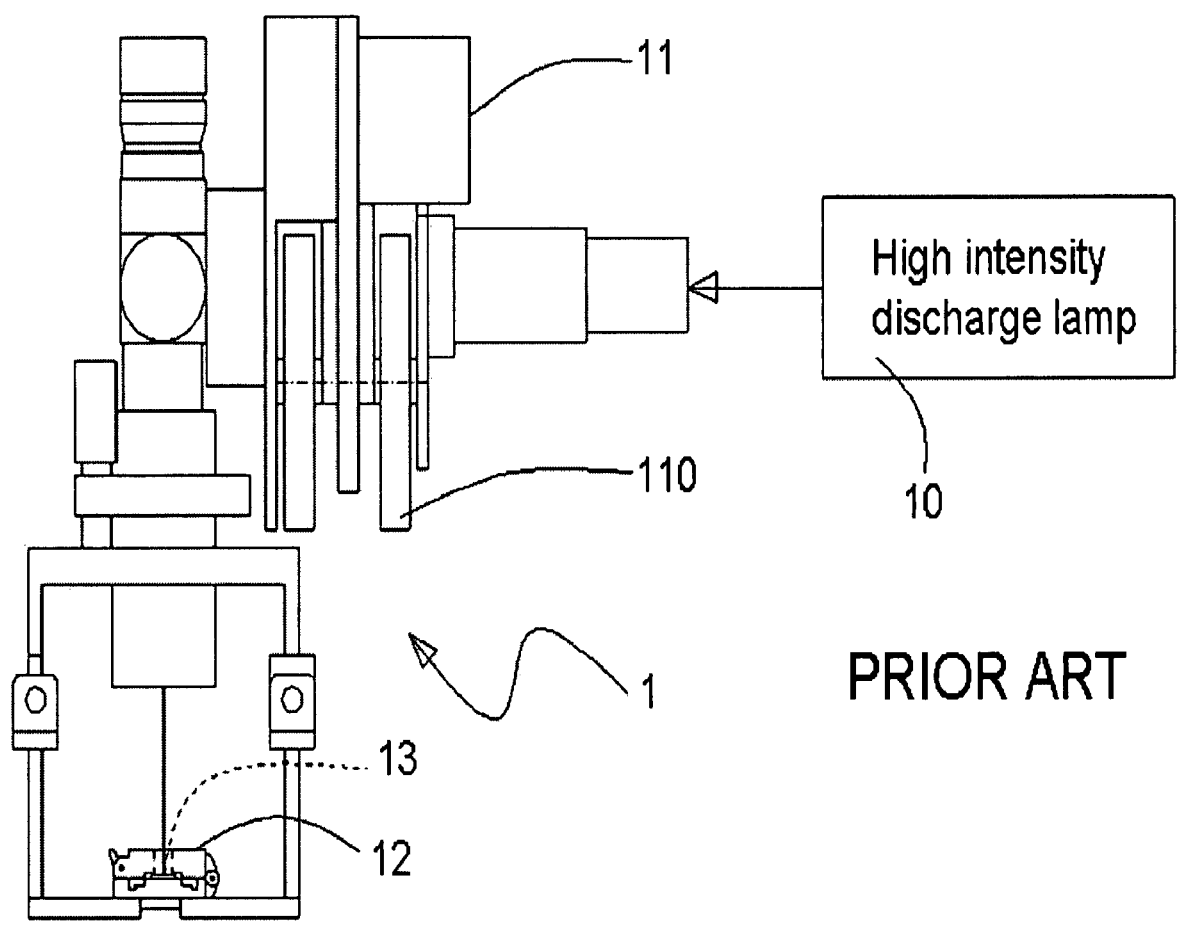
FIG. 1 is a schematic front view of a conventional photosensor testing system.
Figure 2:
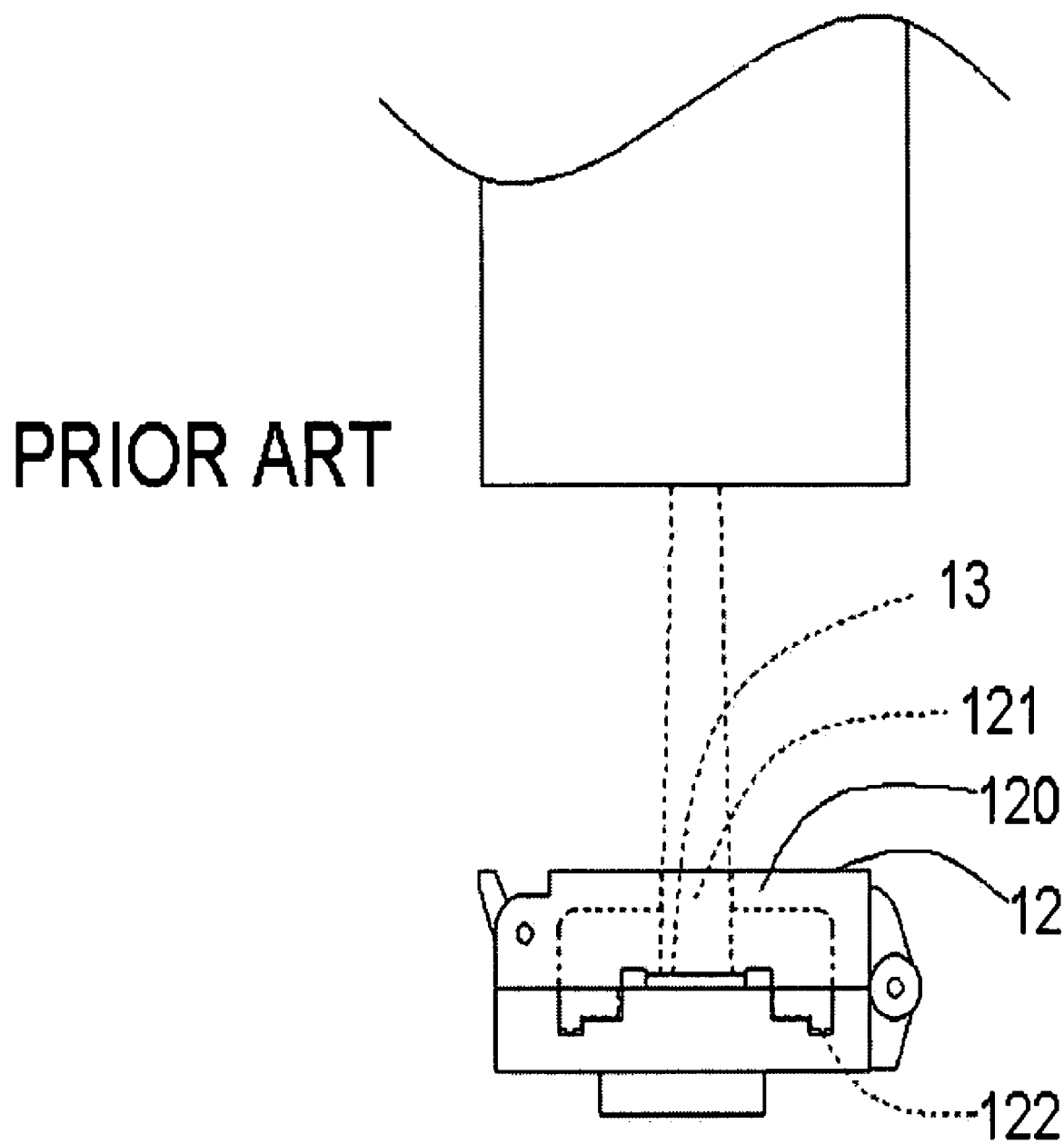
FIG. 2 is an enlarged partial structural view illustrating the testing device of FIG. 1.
Figure 3:
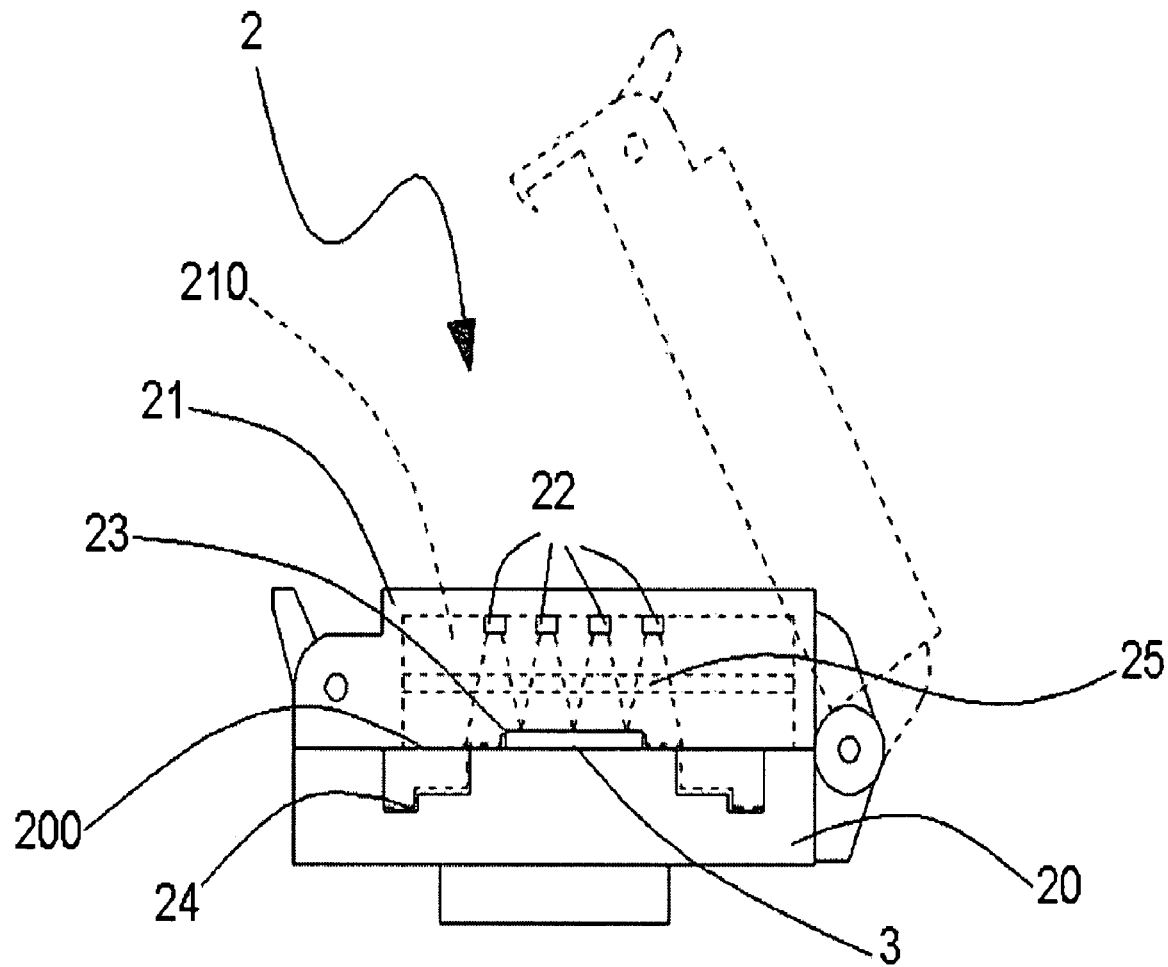
FIG. 3 is a schematic structural diagram illustrating a preferred embodiment of the testing device according to the present invention.
Figure 4:
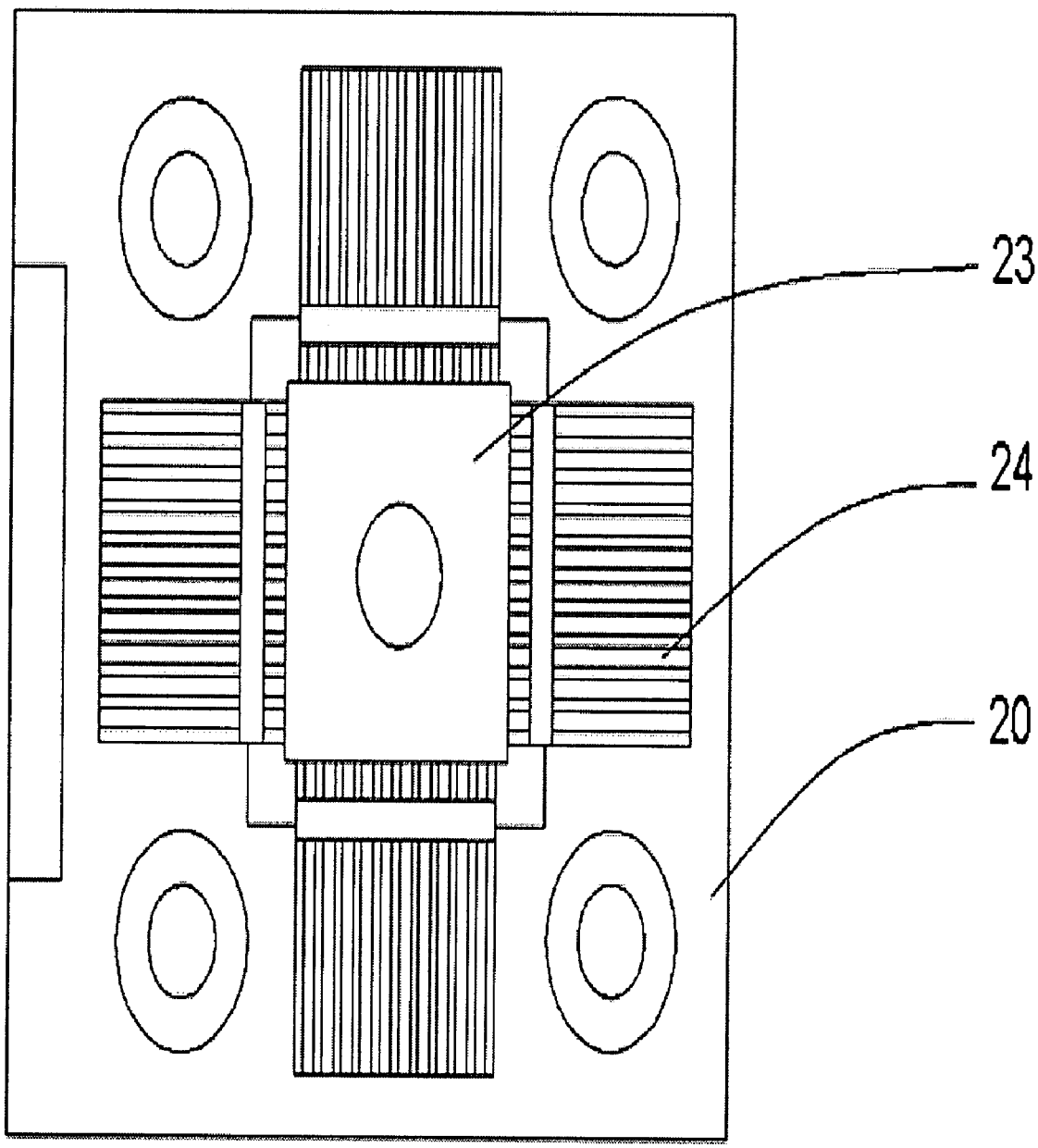
FIG. 4 is a partial top view of the base of FIG. 3, illustrating the surface of the base of the testing device.

As shown in FIGS. 3 and 4, a preferred embodiment of the testing device 2 according to the present invention comprises a base 20, an upper cover 21, and at least one light emitting diode assembly 22.

The base 20 is equipped with a loading portion 200, in this embodiment, a square accommodating space 23 for receiving a photosensor under test, such as a CMOS or a CCD chip, is formed on the loading portion 200. However, the accommodating space 23 also could be a cave or any well-known caging structure else without limitation of the above shape.

Referring to FIG. 4 at the same time, in this embodiment, the loading portion 200 is provided with a plurality of metal leads 24 uniformly around the bottom wall which forms the accommodating space 23. These metal leads are allowed to electrically connect with the electric contacts of photosensor under test 3, and the metal leads 24 are parallel arranged on the loading portion 200 extending away from the photosensor under test 3 to the position near the peripheral wall of base 20. In this manner, the photosensor 3 could be driven by the electric energy of the tester then converting the measured light beams into the electric output signals.

The upper cover 21 is disposed above the base 20 via a pivot and allowed to be opened or closed relative to the base 20. The upper cover 21 is inwardly caved at the face facing the base 20 to form a cave 210, and the white light emitting diode assembly 22 of this embodiment is mounted inside the cave 210.

In the actual testing process, the upper cover 21 is set in an open state (as shown in dashed line) first, and the photosensor under test 3 is placed into the accommodating space 23 of the base. The upper cover 21 is then closed and the photosensor under test 3 is pressed downward until its electric contacts connected to those leads 24. Subsequently, the light emitting diode assembly 22 is activated to emit light, projecting the light beams on the surface of the photosensor under test 3 through an optical component such as a liquid crystal plate 25. Each sensing unit (i.e. cell, not shown) of the photosensor under test 3 receives the image data via the liquid crystal plate 25 and then the corresponding sense signals by its conversion would be sent to the controller through the leads 24 thus followed by the operations such as compensation, classification (shipping inspection), reduction of the pixel numbers and gray scales of sub-quality products, and the like according to the testing results.

Since the technology for driving a light emitting diode assembly 22 to emit light is relatively mature, the control of luminous intensity, image fringes, patterns and the like is all readily accessible. Furthermore, the LED assembly could emit light at stable wavelength to provide a light source with an ideal light beam, thereby improving the testing accuracy.

To change the luminous signal of a light source activated and controlled by the power supply is more convenient and rapid than the conventional technique of mechanical control by rotating a color wheel. This would not only significantly reduce the volume of the tester, but also obviously shorten the testing time, thus increasing the testing efficiency.

Figure 5:
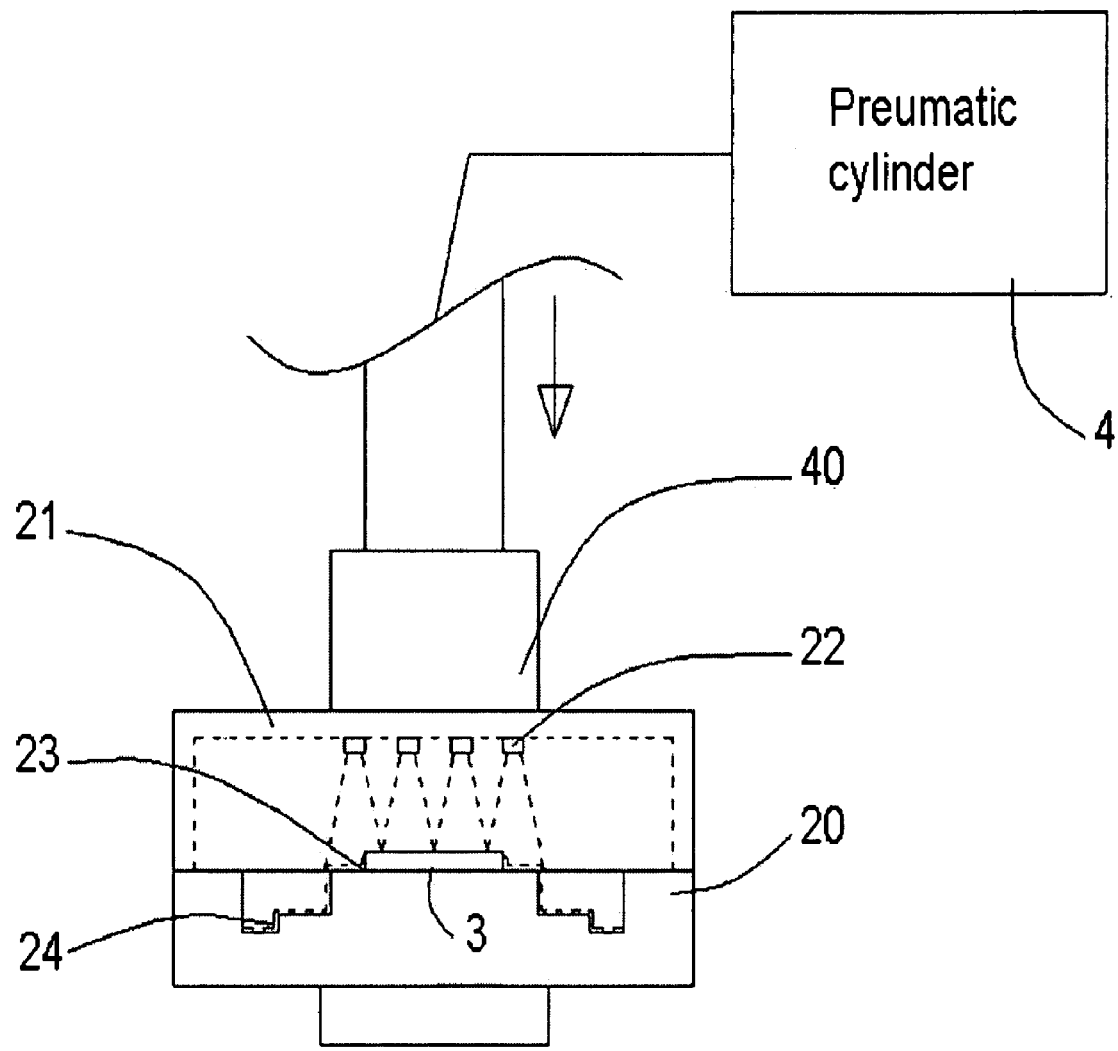
FIG. 5 is a schematic structural diagram illustrating another preferred embodiment of the testing device according to the present invention.

FIG. 5 shows another preferred embodiment according to the present invention, where this embodiment mainly differs from the previous in that the upper cover 21 is connected to a manipulator 40 driven by a pneumatic cylinder 4, so that the pneumatic cylinder 4 enables the manipulator 40 to interlock the upper cover 21 moving up and down. The upper cover 21 is pressed downward to a testing position after the photosensor under test being placed into the base 20, and opened up after the testing.

Figure 6:
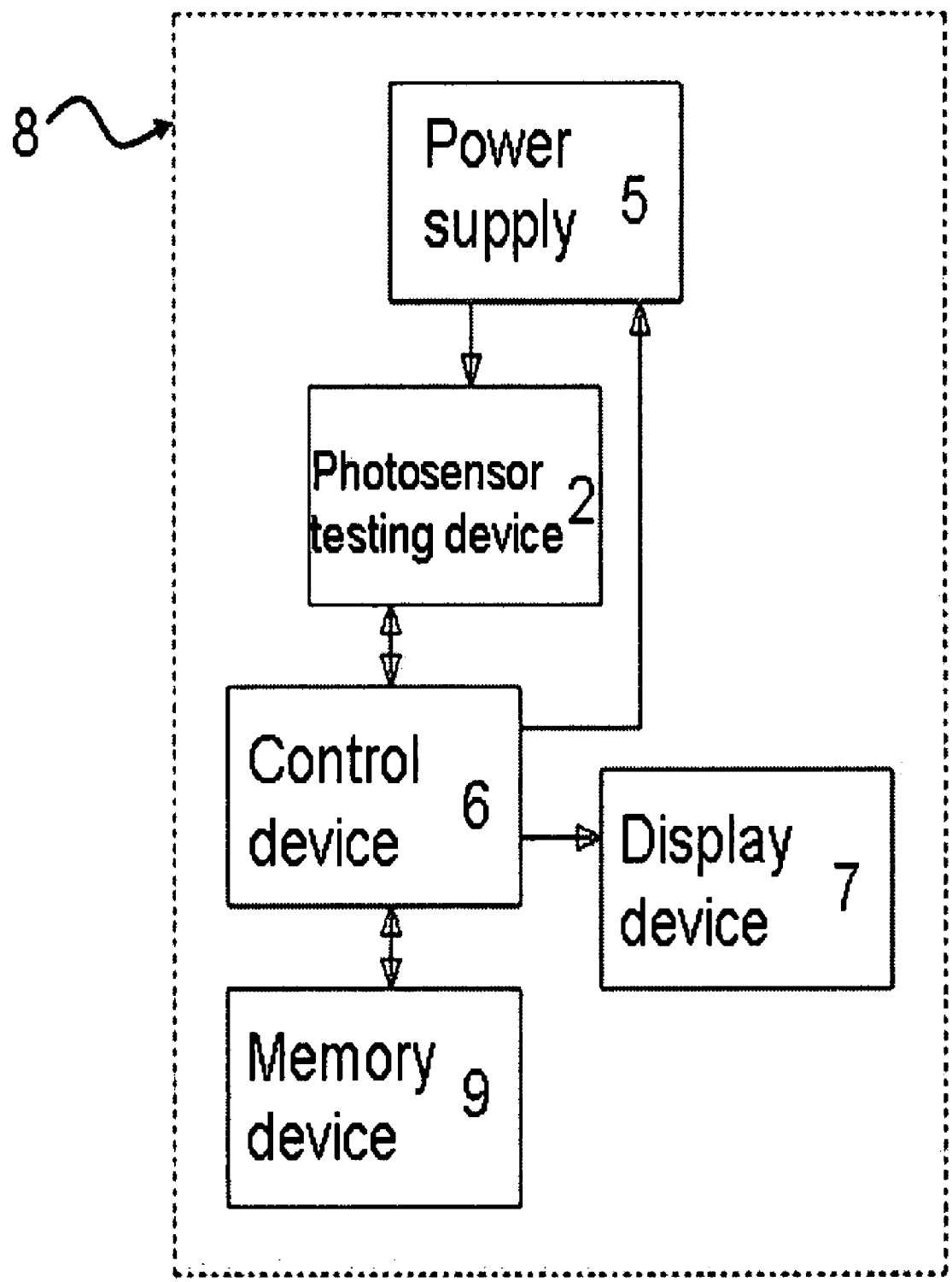
FIG. 6 is a structural block diagram illustrating a tester with the testing device according to the present invention.

Needless to say, it should be easily realized by those skilled in the art that the optical component of the previous embodiment is not necessary. The light source used in the present invention exhibits higher stability, and therefore, when the pre-calibration is performed, a photosensor sample with the best performance is placed in the loading portion to measure the patterns of the light beam emitted by each chip illuminating the photosensor under test and then stored in the memory device 9. As a result, in use of the tester 8 provided with the photosensor testing device 2 according to the present invention, as shown in FIG. 6, after the power supply 5 is provided to enable the photosensor testing device 2, the measurement signal from the photosensor testing device 2 would be inputted into the controller 60. Then, the controller 60 compares this signal with the data pre-stored in the memory device 9 and displays the related information on the display device 7.

In this embodiment, the controller 60 is exemplary as a computer unit including a processor, which could conduct arithmetic operations according to its built-in programs so as to input the corresponding instructions or data; the power supply 5 receives the corresponding voltage outputted by the controller 60 to control the on/off and brightness of the light emitting diode assembly 22 in the photosensor testing device 2. The memory device 9 is intended to record the brightness distribution data on the loading portion 200 illuminated by the light source and allow the processor in the controller 60 to compare these with the data measured by the photosensor under test 3. The display device 7, such as a liquid crystal display, is provided for displaying the testing data to operators.

By means of the above configuration, the light emitting diode assembly 22 is mounted inside the upper cover 21 of the photosensor testing device 2, thus reducing the bulk volume of the photosensor testing device 2 and greatly lowering the manufacturing cost. Also, the light emitting diode assembly 22 shows the variations in its intensity and wavelength of light under control and the stable wavelength characteristics, which advantageously meet various testing requirements, and the testing process is more easily controlled as well as would be speeded up and its accuracy could be improved effectively. Furthermore, the light emitting diode assembly 22 has longer life so that it is unnecessary to replace the light source and the cost would be considerably lowered.

Figure 7:
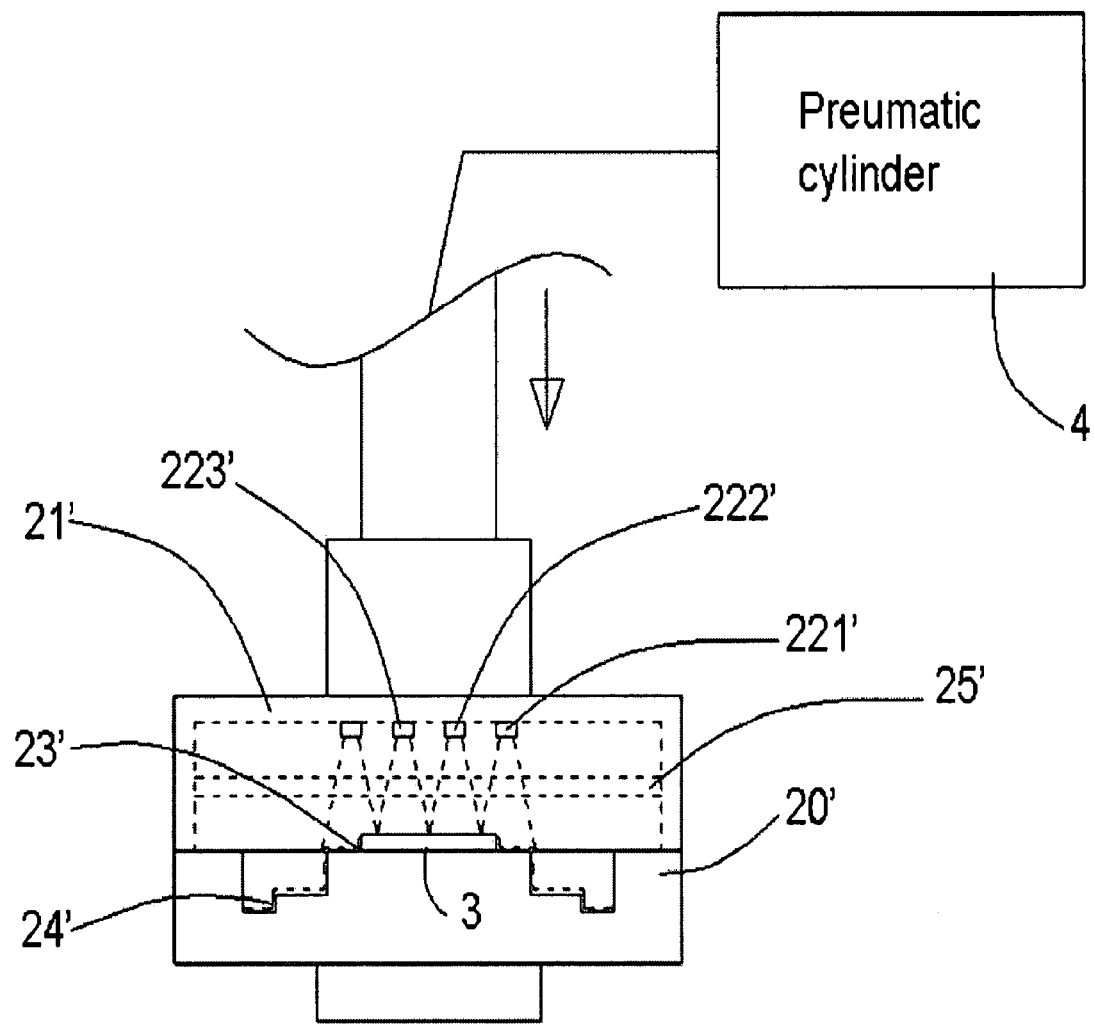
FIG. 7 is a schematic structural diagram of another preferred embodiment according to the present invention.

It is understood to use light source as shown in FIG. 7, the third preferred embodiment according to the present invention. LED chips/dies 221', 222', 223' with three colors of red, green and blue by color light separation are arranged to serve as light sources and activated to emit light respectively or shoot in mixed-light depending on requirements, besides the structures of base 20', upper cover 21', accommodating space 23', leads 24' and the like as same as those in the foregoing embodiments. It should be readily realized by those skilled in the art that the structures disclosed by the present invention merely show less uniformity of illumination, hence, if unnecessary to evaluate each cell in specific patterns when testing, an optical component would be further installed between the light emitting diode chips/dies 221', 222', 223' and the photosensor under test 3 for diffusing and homogenizing the light beams from those light emitting diode chips/dies 221', 222', 223', as shown in this embodiment. Here, for example, a light-homogenizing device 25' is adopted as an optical component for diffusing the projecting light beams and uniformly projecting them onto the photosensor under test 3. No doubt conventional optical devices such as an optical lens module may also be used.

What has been described above are the preferred embodiments of the present invention only, it is not intended to limit the scope of practice of the present invention, in principle, simple equivalent changes and modifications made according to the claims and specification should be included within the scope of the claims.

What is claimed is:

1. A photosensor testing device with a built-in light source provided for testing a photosensor under test having a plurality of electric contacts, comprising:
   a base equipped with a loading portion for receiving and electrically connected to said photosensor under test, wherein said loading portion is provided with a plurality of leads corresponding to and electrically connected to the electric contacts of said photosensor under test for transmitting the signals of said photosensor under test; and
   an upper cover disposed above said base and allowed to move between an open position relative to said base for loading/removing said photosensor under test and a testing position relative to said base for tightly electrically connecting the electric contacts of said photosensor under test with the leads of said loading portion, and a light emitting diode assembly being mounted inside said upper cover in such a manner that the light emitting diode assembly faces said photosensor under test when said upper cover is at the testing position, with its light emitting direction facing said photosensor under test.

2. The photosensor testing device according to claim 1, wherein said upper cover is pivotally disposed above said base via a pivot.

3. The photosensor testing device according to claim 1, wherein said upper cover is inwardly caved at the face facing said base to form a cave, and said light emitting diode assembly is mounted inside said cave.

4. The photosensor testing device according to claim 1, wherein said light emitting diode assembly includes three separate light emitting chips/dies of red, green and blue colors.

5. The photosensor testing device according to claim 1, further comprising an optical component located between said light source and said loading portion for diffusing and homogenizing the light beams from said chips/dies.

6. The photosensor testing device according to claim 1, further comprising a liquid crystal device located between said light source and said loading portion for displaying image data.

7. A tester provided for testing a photosensor under test having a plurality of electric contacts, comprising:
   a power supply;
   a photosensor testing device, including:
      a base equipped with a loading portion for receiving and electrically connected to said photosensor under test, wherein said loading portion is provided with a plurality of leads corresponding to and electrically connected to the electric contacts of said photosensor under test for transmitting the signals of said photosensor under test; and
      an upper cover disposed above said base and allowed to move between an open position for loading/removing said photosensor under test and a testing position for tightly electrically connected to said loading portion relative to said base, and at least one light emitting diode assembly, which is activated by said power supply, being mounted inside said upper cover in such a manner that the light emitting diode assembly faces said photosensor under test when said upper cover is at the testing position, with its light emitting direction facing said photosensor under test;
   a controller which controls said power supply to activate said light emitting diode assembly; and
   a driver which is driven by said controller then actuating said upper cover.

8. The tester according to claim 7, wherein said driver includes a pneumatic cylinder and a manipulator driven by the pneumatic cylinder, coupled to and actuating the upper cover.

9. The tester according to claim 8, further comprising a display device for displaying the data from said controller.

10. The tester according to claim 8, further comprising a memory device for recording the brightness distribution data on the surface of said loading portion illuminated by the light source and allowing said controller to compare the above data with the data measured by said photosensor under test.

* * * * *